United States Patent [19]
Force

[11] Patent Number: 5,813,730
[45] Date of Patent: Sep. 29, 1998

[54] RETROFIT AIR DISTRIBUTION APPARATUS FOR A LOCOMOTIVE BRAKING SYSTEM

[75] Inventor: Herman Marshall Force, Parkville, Mo.

[73] Assignee: Technical Services and Marketing, Inc., Kansas City, Mo.

[21] Appl. No.: 753,544

[22] Filed: Nov. 26, 1996

[51] Int. Cl.$^6$ ..................................................... B60T 7/00
[52] U.S. Cl. ................................................. 303/15; 303/3
[58] Field of Search ................................... 303/3, 15, 20, 303/7, 36, 40, 16

[56] References Cited

U.S. PATENT DOCUMENTS

| | | | |
|---|---|---|---|
| 5,104,203 | 4/1992 | Ferri | 303/15 |
| 5,237,604 | 8/1993 | Ryan. | |
| 5,286,096 | 2/1994 | Ferri et al. | 303/15 |
| 5,335,974 | 8/1994 | Klink. | |
| 5,393,129 | 2/1995 | Troiani et al. | |
| 5,676,431 | 10/1997 | McLaughlin et al. | 303/15 |
| 5,746,484 | 5/1998 | Gaughan et al. | 303/15 X |

*Primary Examiner*—Lee W. Young
*Attorney, Agent, or Firm*—Hovey, Williams, Timmons & Collins

[57] ABSTRACT

An air distribution apparatus (10) configured to retrofit with an existing air brake valve (18) of a locomotive braking system (12) to act as an interface with an electronic braking control device (14). The air distribution apparatus (10) includes a distribution body (56) configured for connection between the relay valve (28) and pipe bracket (30) portions of the brake valve (18), a plurality of passageways (58,60, 62,64,66 and 68) formed in the distribution body (56) for delivering air between the brake valve (18) and the other components of the locomotive braking system (12), and a plurality of solenoid valves (70,72 and 74) electrically coupled with the electronic control device (14) and positioned in the passageways (62,66 and 68) for controlling the air flow through the passageways for permitting electronic control of the brake valve (18) utilizing feedback from pressure sensors (76,78) for safety and decision-making purposes.

14 Claims, 1 Drawing Sheet

RETROFIT AIR DISTRIBUTION APPARATUS FOR A LOCOMOTIVE BRAKING SYSTEM

BACKGROUND OF THE INVENTION

1. Field of the Invention

The present invention relates to locomotive braking systems. More particularly, the invention relates to an air distribution apparatus configured to retrofit with an existing air brake valve of a locomotive brake system and to act as an interface with an electronic braking control device.

2. Description of the Prior Art

A typical prior art locomotive braking system includes a reservoir for holding pressurized air, at least one air operated brake cylinder, a brake valve for directing air from the reservoir to the brake cylinder to operate the brake cylinder, and a control valve typically located in the train locomotive for controlling the operation of the brake valve. An engineer operates the locomotive braking system by activating the control valve, thus directing a control air signal to the brake valve. The brake valve responds to the control air signal by directing a proportionate amount of operating air from the reservoir to the brake cylinder, thus operating the locomotives brakes.

Those skilled in the art will appreciate that prior art locomotive braking systems are complicated and difficult to maintain, clean and inspect due to the many air operated components. Additionally, the air distribution piping and the connections between the piping and the various air-operated components frequently leak. In response to these problems, electronically controlled braking systems have been proposed.

Electronic braking for locomotives is also necessary so that the locomotive brakes can operate in conjunction with the train brakes when operating a train equipped with electro-pneumatic brakes. Currently trains that operate in electro-pneumatic mode do not have locomotive brakes that respond to the electro-pneumatic system.

SUMMARY OF THE INVENTION

The present invention solves the above-described problems and provides a distinct advance in the art of locomotive braking systems. More particularly, the present invention provides an air distribution apparatus configured to retrofit with an existing locomotive brake valve and to interface with an electronic braking control device. This allows both conventional air control and electronic control of the brake valve.

The air distribution apparatus of the present invention broadly includes a distribution body configured for connection with the brake valve of a locomotive braking system and having a plurality of air passageways formed therein. The air passageways deliver air between the brake valve and the air reservoir, control valve, and brake cylinder of the locomotive braking system.

The apparatus also includes at least one solenoid valve positioned in the passageways for controlling the air flow through the passageways. The solenoid valves are configured for electrically coupling with an electronic control device of the locomotive braking system to permit electronic control of the solenoid valves and therefore the brake valve.

In a preferred embodiment of the invention, the distribution body includes an operating air passageway for delivering operating air from the reservoir of the locomotive braking system to the brake valve, a control air passageway for delivering control air from a control valve of the locomotive braking system to the brake valve, and a fill passageway interconnecting the operating air passageway and the control air passageway. To permit electronic control of the brake valve by the electronic control device, a solenoid valve is disposed within the fill passageway and electrically coupled with the electronic control device for controlling the flow of air between the operating air passageway and the control air passageway, and another solenoid valve is disposed within the control air passageway and electronically coupled with the control device for controlling the flow of air from the control valve to the brake valve. Another solenoid valve is disposed within the control air passageway to vent air from the control air passageway to atmosphere.

When an engineer wishes to initiate electronic control of the locomotive braking system, the engineer enters a command into the electronic control device to close the solenoid valve in the control air passageway. This interrupts the flow of control air from the control valve to the brake valve and thus interrupts the control of the locomotive braking system by the control valve.

The engineer can then enter commands into the electronic control device to control the opening and closing of the solenoid valve in the fill passageway. This permits the engineer to divert a selective amount of operating air from the operating air passageway to the control air passageway to control a brake application with the brake valve with operating air rather than control air. The engineer can then enter commands into the electronic control device to control the opening and closing of the vent valve solenoid to control a brake release with the operating air rather than the control air

BRIEF DESCRIPTION OF THE DRAWING FIGURES

A preferred embodiment of the present invention is described in detail below with reference to the attached drawing figures, wherein:

FIG. 1 is a piping diagram of a locomotive braking system showing the apparatus of the present invention coupled with a brake valve of the braking system and electrically connected with an electronic control device; and FIG. 2 is a schematic representation of the apparatus illustrating the passageways in the distribution body and the solenoid valves for controlling the air flow through the passageways.

DETAILED DESCRIPTION OF A PREFERRED EMBODIMENT

Figure 1:
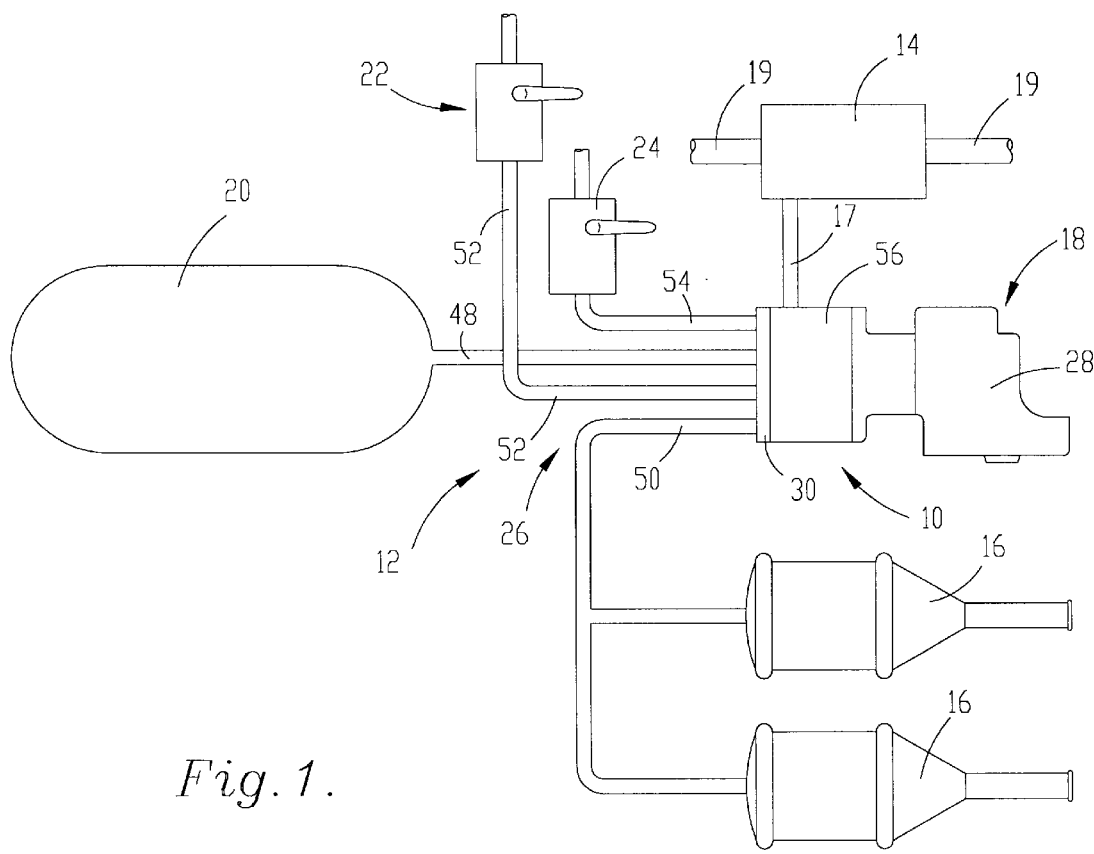

FIG. 1 illustrates air distribution apparatus 10 constructed in accordance with a preferred embodiment of the invention. Air distribution apparatus 10 is configured to retrofit with a conventional locomotive braking system 12 to act as an interface with an electronic control device 14.

Locomotive braking system 12 is conventional and includes at least one brake cylinder 16, brake valve 18, reservoir or tank of pressurized air 20, independent control valve 22, automatic control valve 24, and interconnecting air piping broadly referred to by the numeral 26. Independent control valve 22 is configured for operating the locomotive's brakes independently of the brakes of the other locomotives and cars, while automatic control valve 24 is configured for operating the brakes of all locomotives and cars simultaneously.

In general, reservoir 20 is compressed with air by a compressor powered by a diesel engine of the locomotive.

Brake valve 18 actuates brake cylinders 16 by diverting operating air from reservoir 20 to cylinders 16 when it receives an air control signal from either independent control valve 22 or automatic control valve 24.

Figure 2:
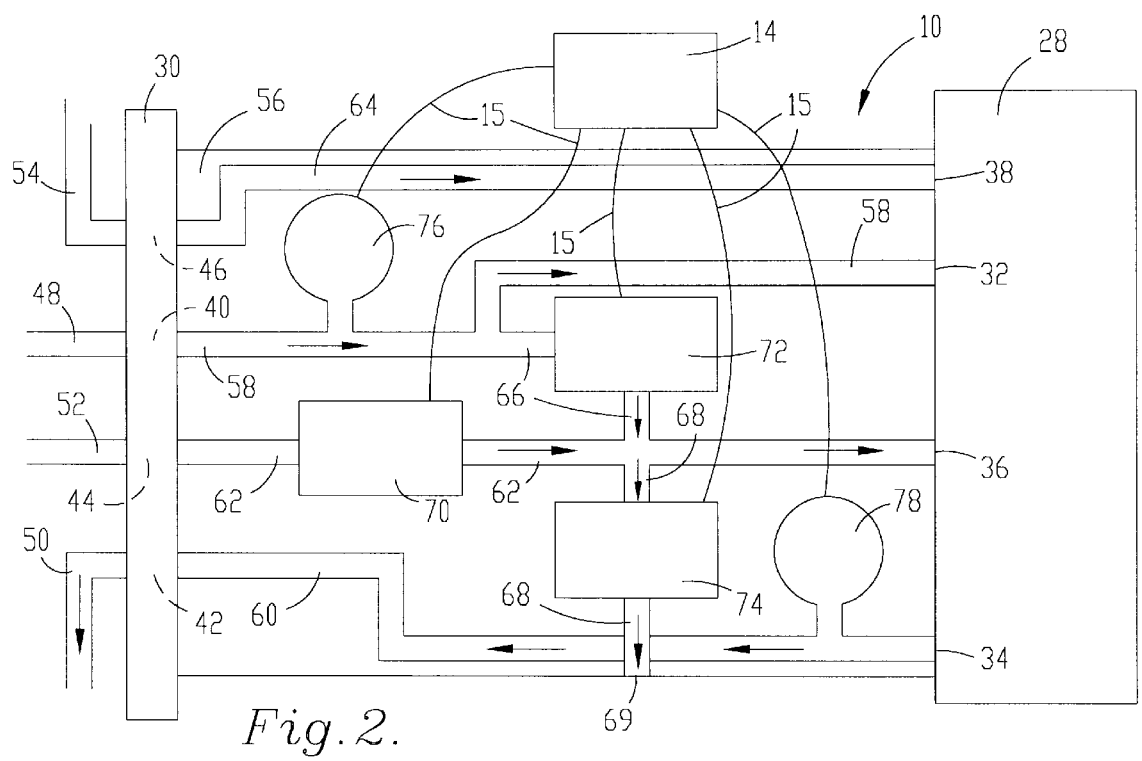

In more detail, brake valve 18 is preferably a J1.6-16 type relay valve and includes relay valve portion 28 and pipe bracket portion 30. As best illustrated in FIG. 2, relay valve portion 28 includes openings defining operating air inlet 32, operating air outlet 34, first control air inlet/outlet 36, and second control air inlet/outlet 38. Pipe bracket portion 30 includes corresponding openings 40,42,44, and 46 that are in alignment with openings 32, 34, 36 and 38, respectively, when apparatus 10 is not retrofit with braking system 12.

Air piping 26 includes line 48 connecting air reservoir 20 with opening 40 and inlet 32, line 50 connecting brake cylinder 16 with opening 42 and outlet 34, line 52 connecting independent control valve 22 with opening 44 and inlet 36, and line 54 connecting automatic control valve 24 with opening 46 and inlet 38.

Electronic control device 14 is also conventional and is preferably a Model No. 81-50101 controller manufactured by Technical Service and Marketing, Inc., of Kansas City, Mo. Control device 14 is preferably positioned in the locomotive and interfaces with the electro-pneumatic braking controller which is operated by the engineer when an elector-pneumatic train is in operation. The electro-pneumatic braking controller, called a "head-end unit" includes entry buttons or keys and associated control circuitry for receiving braking commands from an engineer. The head-end unit converts the braking commands to control signals and sends them to control device 14 for controlling the operation of air distribution apparatus 10 as described below. Control device 14 is electrically coupled with air distribution apparatus 10 by a plurality of wires 15 extending through conduit 17 and may be coupled with the head-end unit and other control devices by wire extending through conduit 19.

Air distribution apparatus 10 includes distribution body 56, which is preferably cylindrically shaped, configured for interconnection between relay valve portion 28 and pipe bracket portion 30 of brake valve 18. As best illustrated in FIG. 2, distribution body 56 has a plurality of air passageways formed therethrough including operating air passageway 58, brake cylinder passageway 60, first control air passageway 62, second control air passageway 64, fill passageway 66 and vent passageway 68.

Operating air passageway 58 connects operating air inlet 32 with opening 40 for delivering operating air from reservoir 20 and line 48 to relay valve portion 28 of brake valve 18. Brake cylinder air passageway 60 connects air outlet 34 with opening 42 for delivering operating air from relay valve portion 28 of brake valve 18 to brake cylinders 16.

Control air passageway 62 connects air inlet 36 with opening 44 for delivering control air from line 52 and independent control valve 22 to relay valve portion 28 of brake valve 18. Control air passageway 64 connects air inlet 38 with opening 46 for delivering control air from line 54 and automatic control valve 24 to relay valve portion 28 of brake valve 18.

Fill passageway 66 interconnects operating air passageway 58 with control air passageway 62 for permitting operating air to enter control air passageway 62 as described below. Vent passageway 68 connects control air passageway 62 and fill passageway 66 with vent hole 69 formed in distribution body 56 for venting air from the passageways 62, 66.

Air distribution apparatus 10 also includes a plurality of solenoid valves positioned in passageways 66 and 68 and electrically coupled with electronic control device 14 for permitting control of brake valve 18 by device 14. Specifically, solenoid valve 70 is disposed within control air passageway 62, solenoid valve 72 is disposed within fill passageway 66, and solenoid valve 74 is disposed within vent passageway 68. Each solenoid valve 70,72,74 is configured for selectively opening or closing its respective passageway upon receiving control signals from electronic control device 14.

During normal, non-electronic operation of locomotive braking system 12, control device 14 is de-energized, solenoid valve 70 is opened and solenoid valves 72,74 are closed. This permits independent control valve 22 to deliver control air to control air inlet 36 of brake valve 18 by line 52. This also permits automatic control valve 24 to deliver control air to control air inlet 38 by line 54. Thus, an engineer can actuate brake cylinders 16 in a conventional manner by operating either independent control valve 22 or automatic control valve 24 to trigger brake valve 18 to deliver operating air to brake cylinders 16.

To provide electronic control of locomotive braking system 12, control device 14 is energized to control the opening and closing of solenoid valves 70,72,74. The engineer first enters a command into device 14 to close solenoid valve 70. This interrupts the delivery of control air from independent control valve 22 to inlet 36 and thus prevents valve 22 from actuating brake cylinders 16.

The engineer can then enter commands into device 14 to control the opening and closing of solenoid valves 72 and 74. To apply the locomotive's brakes, the engineer enters a command to open solenoid valve 72, thus diverting operating air from operating air passageway 58 through fill passageway 66 and to control air passageway 62. This controls the operation of brake valve 18 with operating air flowing through fill passageway 66 rather than with control air from valve 22.

The engineer can control the amount of brake force applied by brake cylinders 16 by controlling how long solenoid valve 72 is opened, thus controlling the amount of air that is delivered to control air inlet 36. For example, if the locomotive brakes are released, the engineer can select a desired target brake cylinder at the head-end unit. This target pressure is sent to the electronic control device 14. Control device 14 opens solenoid valve 72, which allows operating air to flow from air passageway 58 through 66 to 62. Brake cylinder pressure then starts to build up in air passageway 60. The pressure in passageway 60 is sensed by pressure sensor 78, which is described below.

Pressure sensor 78 is continually monitored by control device 14. When control device 14 senses that the target pressure selected by the engineer and the brake cylinder pressure as sensed by pressure sensor 78 are equal, control device 14 will close solenoid valve 72. This interrupts air flow from air passageway 58 through 66 into 62 since the target brake cylinder pressure has been attained.

When the engineer wishes to release brake cylinders 16 either fully or partially, the engineer enters a command into the head-end unit. This delivers the target release pressure to the electronic control device 14 to open solenoid valve 74. This vents the air from control air passageway 62 out of vent 69. This then triggers brake valve 18 to release pressure from the brake cylinders 16. When the target release pressure is attained as sensed by pressure sensor 78, solenoid valve 74 will close and the lower target brake cylinder pressure will be attained.

Advantageously, air distribution apparatus 10 does not prevent conventional air operation of braking system 12 even while electronic control device 14 is energized. Braking system 12 can be operated by automatic control valve 24 at any time since control air passageway 64 remains uncontrolled. This permits an engineer to apply the locomotive brakes in a conventional manner by activating valve 24, and thus permits air distribution apparatus 10 to be installed into braking system 12 as a retrofit without eliminating conventional air control of system 12.

Air distribution apparatus 10 also preferably includes pressure sensors 76,78 electronically coupled with control device 14. Pressure sensor 76 is disposed within operating air passageway 58 for monitoring the pressure of the operating air being delivered to brake valve 18. This insures that an adequate pressure of operating air is available to operate brake valve 18.

As discussed above, pressure sensor 78 is disposed within brake cylinder passageway 60 for monitoring the pressure of the operating air being delivered to brake cylinders 16. This permits the engineer to accurately monitor the operation of brake cylinder 28 when solenoid valves 72,74 are being controlled and provides the feedback necessary to the target brake cylinder pressure.

Although the invention has been described with reference to the preferred embodiment illustrated in the attached drawing figures, it is noted that equivalents may be employed and substitutions made herein without departing from the scope of the invention as recited in the claims. For example, although the invention has been described as a retrofit for an existing conventional air-operated locomotive brake system, it could be easily modified to provide full-time electronic control of the brake valve 18. In this embodiment, the control valves 22,24 and the associated piping would be removed and the brake valve 18 would be controlled exclusively by solenoids 72 and 74.

Having thus described the preferred embodiment of the invention, what is claimed as new and desired to be protected by Letters Patent includes the following:

1. In a locomotive braking system including a brake cylinder, a brake valve, a reservoir of pressurized air, and a control valve, the brake valve including an operating air inlet for receiving operating air from the reservoir, and a control air inlet for receiving control air from the control valve, an air distribution apparatus for allowing at least partial control of the braking system by an electronic control device, said air distribution apparatus comprising:

a distribution body configured for connection with the brake valve;

an operating air passageway extending through said distribution body for delivering operating air from the reservoir to the operating air inlet of the brake valve;

a control air passageway extending through said distribution body for delivering control air from the control valve to the control air inlet of the brake valve;

interrupting means disposed within said control air passageway for interrupting the delivery of control air from the control valve to the control air inlet of the brake valve; and diverting means coupled between said operating air passageway and said control air passageway for diverting a portion of the operating air in said operating air passageway to said control air passageway for controlling the operation of the brake valve with the diverted operating air.

2. The apparatus as set forth in claim 1, said interrupting means including a solenoid valve disposed within said control air passageway and controlled by the electronic control device for interrupting the delivery of control air from the control valve to the control air inlet of the brake valve upon receiving a signal from the electronic control device.

3. The apparatus as set forth in claim 2, said diverting means including a fill passageway interconnecting said operating air passageway and said control air passageway and a solenoid valve disposed within said fill passageway and controlled by the electronic control device for diverting a portion of the operating air in said operating air passageway to said control air passageway upon receiving a signal from the electronic control device.

4. The apparatus as set forth in claim 3 further including venting means for venting the air from said control air passageway to trigger the brake valve to release the brake cylinder.

5. The apparatus as set forth in claim 4, said venting means including a vent passageway connecting said control air passageway to a vent and a solenoid valve disposed within said vent passageway and controlled by the electronic control device for venting the air from said control air passageway upon receiving a signal from the electronic control device.

6. The apparatus as set forth in claim 1 further including a pressure sensor coupled with said operating air passageway and electrically connected with the electronic control device for measuring the pressure of the operating air in said operating air passageway and for transmitting a signal representative of said measured pressure to the electronic control device.

7. The apparatus as set forth in claim 1, the brake valve further including an operating air outlet for delivering the received operating air to the brake cylinder, said air distribution apparatus further including a brake cylinder air passageway extending through said distribution body for delivering the operating air from the operating air outlet to the brake cylinder.

8. The apparatus as set forth in claim 7 further including a pressure sensor coupled with said brake cylinder air passageway and electrically connected with the electronic control device for measuring the pressure of the operating air in said brake cylinder air passageway and transmitting a signal representative of said measured pressure to the electronic control device.

9. The apparatus as set forth in claim 1, the brake valve including a relay portion and a pipe bracket portion, said distribution body being configured for interconnections between the relay portion and the pipe bracket portion.

10. In a locomotive braking system including a brake cylinder, a brake valve, a reservoir of pressurized air, and a control valve, the brake valve including an operating air inlet for receiving operating air from the reservoir, an operating air outlet for delivering the received operating air to the brake cylinder, and a control air inlet for receiving control air from the control valve, an air distribution apparatus for allowing at least partial control of the braking system by an electronic control device, said air distribution apparatus comprising:

a distribution body configured for connection with the brake valve;

an operating air passageway extending through said distribution body for delivering operating air from the reservoir to the operating air inlet of the brake valve;

a control air passageway extending through said distribution body for delivering control air from the control valve to the control air inlet of the brake valve;

a brake cylinder air passageway extending through said distribution body for delivering the operating air from the operating air outlet to the brake cylinder;

a solenoid valve disposed within said control air passageway and controlled by the electronic control device for interrupting the delivery of control air from the control valve to the control air inlet of the brake valve upon receiving a signal from the electronic control device;

a fill passageway interconnecting said operating air passageway and said control air passageway; and a solenoid valve disposed within said fill passageway and controlled by the electronic control device for diverting a portion of the operating air in said operating air passageway to said control air passageway upon receiving a signal from the electronic control device.

11. The apparatus as set forth in claim 10, further including a vent passageway connecting said control air passageway to a vent and a solenoid valve disposed within said vent passageway and controlled by the electronic control device for venting the air from said control air passageway upon receiving a signal from the electronic control device.

12. The apparatus as set forth in claim 11, further including a pressure sensor coupled with said operating air passageway and electrically connected with the electronic control device for measuring the pressure of the operating air in said operating air passageway and transmitting a signal representative of said measured pressure to the electronic control device.

13. The apparatus as set forth in claim 10, further including a pressure sensor coupled with said brake cylinder air passageway and electrically connected with the electronic control device for measuring the pressure of the operating air in said brake cylinder air passageway and transmitting a signal representative of said measured pressure to the electronic control device.

14. The apparatus as set forth in claim 10, the brake valve including a relay portion and a pipe bracket portion, said distribution body being configured for interconnections between the relay portion and the pipe bracket portion of the brake valve.

* * * * *